(12) United States Patent
Brück et al.

(10) Patent No.: US 7,833,319 B2
(45) Date of Patent: Nov. 16, 2010

(54) METHOD AND DEVICE FOR WELDING METALLIC FIBERS INTO A FLEECE BY REPEATEDLY CARRYING OUT A WELDING PROCESS, FLEECE HAVING WELDED METALLIC FIBERS AND METHOD OF FILTERING EXHAUST GAS WITH A FLEECE

(75) Inventors: Rolf Brück, Bergisch Gladbach (DE); Gottfried Wilhelm Haesemann, Kürten (DE)

(73) Assignee: Emitec Gesellschaft fuer Emissionstechnologie mbH, Lohmar (DE)

(*) Notice: Subject to any disclaimer, the term of this patent is extended or adjusted under 35 U.S.C. 154(b) by 413 days.

(21) Appl. No.: 11/942,366

(22) Filed: Nov. 19, 2007

(65) Prior Publication Data

US 2008/0289503 A1    Nov. 27, 2008

Related U.S. Application Data

(63) Continuation of application No. PCT/EP2006/004482, filed on May 12, 2006.

(30) Foreign Application Priority Data

May 17, 2005  (DE) .................. 10 2005 023 384

(51) Int. Cl.
*B01D 46/00* (2006.01)
(52) U.S. Cl. .................. 95/273; 55/525; 55/526; 55/527; 55/DIG. 5; 156/167; 442/181; 442/183; 442/377; 442/378; 219/86.23; 219/86.7; 219/86.9; 219/125.1; 219/125.11; 219/617; 219/619

(58) Field of Classification Search ............ 55/522–527, 55/DIG. 5; 264/6, 12, 112, 518, 115, 167; 156/167; 422/28, 37; 95/273; 442/181, 442/183, 377, 378; 219/86.23, 86.7, 86.9, 219/125.1, 125.11, 617, 619
See application file for complete search history.

(56) References Cited

U.S. PATENT DOCUMENTS

| 2,065,546 A | 12/1936 | Young et al. |
| 3,026,404 A | 3/1962 | Harris |
| 5,244,482 A * | 9/1993 | Hassenboehler et al. ...... 55/528 |

(Continued)

FOREIGN PATENT DOCUMENTS

DE           355662          6/1922

(Continued)

OTHER PUBLICATIONS

English translation of Korean Office Action dated Oct. 19, 2009.

*Primary Examiner*—Duane Smith
*Assistant Examiner*—Minh-Chau Pham
(74) *Attorney, Agent, or Firm*—Laurence A. Greenberg; Werner H. Stemer; Ralph E. Locher

(57) ABSTRACT

A method and a device produce a fleece of metallic fibers in a layer in which the metallic fibers are welded to one another to form the fleece. A welding process is repeatedly carried out with regard to a portion or section of the fleece. Such metallic fiber fleeces are used, in particular, for exhaust gas treatment units in the automobile industry.

20 Claims, 4 Drawing Sheets

U.S. PATENT DOCUMENTS

| | | |
|---|---|---|
| 5,425,236 A | 6/1995 | Haerle |
| 5,445,768 A * | 8/1995 | Hauber et al. .................. 264/6 |
| RE35,206 E * | 4/1996 | Hassenboehler et al. ...... 55/528 |
| 6,315,806 B1 * | 11/2001 | Torobin et al. ................ 55/522 |
| 6,674,042 B1 | 1/2004 | Walder et al. |
| 2004/0247927 A1 | 12/2004 | Kurz |

FOREIGN PATENT DOCUMENTS

| | | |
|---|---|---|
| EP | 0411421 A1 | 2/1991 |
| EP | 0 665 367 A2 | 8/1995 |
| FR | 2815808 A1 | 4/2002 |
| JP | 3072907 A | 3/1991 |
| JP | 8284279 A | 10/1996 |

* cited by examiner

METHOD AND DEVICE FOR WELDING METALLIC FIBERS INTO A FLEECE BY REPEATEDLY CARRYING OUT A WELDING PROCESS, FLEECE HAVING WELDED METALLIC FIBERS AND METHOD OF FILTERING EXHAUST GAS WITH A FLEECE

CROSS-REFERENCE TO RELATED APPLICATIONS

This is a continuation, under 35 U.S.C. §120, of copending International Application No. PCT/EP2006/004482, filed May 12, 2006, which designated the United States; this application also claims the priority, under 35 U.S.C. §119, of German Patent Application No. 10 2005 023 384.8, filed May 17, 2005; the prior applications are herewith incorporated by reference in their entirety.

BACKGROUND OF THE INVENTION

Field of the Invention

The present invention relates to a method for producing a fleece from metallic fibers, a device for welding metallic fibers, a fleece produced by the method and a method which can be used, in particular, for filtering a stream of exhaust gas from an internal combustion engine.

In the interests of the environment, it is necessary to treat exhaust gas produced by internal combustion engines with regard to the pollutants contained therein. It is known in this context to clean the exhaust gas with respect to the gaseous and/or solid constituents contained therein. For this purpose, catalytically motivated, chemical reactions can be used in just the same way as filtering operations to at least temporarily hold back solid constituents of the exhaust gas, such as for example particulates or ash. For this purpose, the exhaust gas usually flows through at least one exhaust treatment unit, such as for example a catalytic converter, an adsorber, a particle trap and the like. With regard to the filter media that can be used, it is likewise known to use gas-permeable metallic fiber fleeces. The present invention relates, in particular, to the production of a fiber fleece for this intended use.

Due to the intermittent combustion in such internal combustion engines, such as for example gasoline or diesel engines, considerable thermal and dynamic loads occur for such a fiber fleece in the exhaust system. It is therefore necessary to make fiber fleeces of this type with a particularly high strength, in order to avoid fibers becoming detached during operation. On one hand, that would have the result that the desired filter action of the fiber fleece cannot be permanently maintained and, on the other hand, under some circumstances detached fibers would pose a risk to downstream exhaust cleaning units or even persons in the surrounding area.

There are known methods for the production of such fiber fleeces in which welded connections and/or sinterered connections are formed between the fibers of the fleece. With regard to continuous production of such fiber fleeces in series operation, welding methods are to be used with preference, since they can be performed at high speed. However, it has been found in that context that welded connections cannot be produced with adequate process-related reliability to the desired extent.

BRIEF SUMMARY OF THE INVENTION

It is accordingly an object of the invention to provide a method and a device for welding metallic fibers into a fleece by repeatedly carrying out a welding process, a fleece having welded metallic fibers and a method of filtering exhaust gas with a fleece, which overcome or at least partially mitigate the hereinafore-mentioned disadvantages and technical problems of the heretofore-known devices and methods of this general type. In particular, it is an object of the invention to provide a method for producing a fleece from metallic fibers and a device for welding metallic fibers, that reliably produce welded connections at a sufficient number of points of the fleece, in relation to the process and in the course of series production. It is intended in this case to provide a fiber fleece which, in particular, withstands thermal and dynamic loads in the exhaust system of a mobile internal combustion engine. Furthermore, fleeces suitable for this intended use are to be provided.

With the foregoing and other objects in view there is provided, in accordance with the invention, a method for producing a fleece from metallic fibers. The method comprises a) forming a layer with metallic fibers, and b) welding the fibers to one another to form a fleece by repeatedly carrying out a welding process relative to a portion or section of the fleece.

A "fleece" is understood to mean, in particular, a two-dimensional formation, in which it is possible for the fibers forming the fleece to be disposed in an ordered or random manner in relation to one another. Examples of a fleece are woven fabrics, lattice structures, knitted fabrics, random laid layers, etc. The fleece may, in principle, also include at least one additional material, such as for example different kinds of fleeces, powders or the like, with the latter in the end being captivity joined to the fleece. The fleece is formed with fibers of a material that is resistant to high temperatures and corrosion. The "fiber" represents, in particular, a designation for an elongated element and also includes, in particular, elements in the form of wires, chips and the like. The metallic fibers may have a substantially round, oval or polygonal form or shape. Fibers with a flat cross section are particularly preferred. The metallic fibers include, in particular, a material that substantially includes steel as the base material, with high proportions of chromium (for example in a range of from 18 to 21% by weight) and/or aluminum (for example at least 4.5% by weight, in particular at least 5.5% by weight) being provided with preference. In principle, aluminum-coated fibers can also be used. These metallic fibers are preferably formed with a fiber length in the range of from 0.1 to 50 mm (in particular in a range of from 1 to 10 mm) and a fiber diameter in the range of from 0.01 to 0.1 mm (in particular in a range of from 0.02 to 0.05 mm). The porosity of the fleece to be produced preferably lies in a range of from 30% to 80%, in particular in a range of from 45% to 60%.

The formation of a layer according to step a) includes, for example, the sprinkling of a substrate with fibers, so that the latter are disposed at least partially lying one on top of the other. Once the layer has the desired thickness or the desired weight per unit area (for example in the range of from 250 to 1,500 g/m²), this loosely interconnected structure of the metallic fibers is then passed on to a welding process.

As is revealed by step b), the welding of the fibers to one another is performed by repeatedly carrying out a welding process with respect to a portion or section of the fleece or the layer. A portion or section is understood to mean, in particular, a partial region of the fleece or the layer in the transporting direction. A welding process acts regularly on such a portion or section, with a plurality of welded connections between various fibers being produced at substantially the same time within this portion or section.

In this case, it is then proposed that such a portion or section be repeatedly subjected to a welding process, with different welded connections being generated in each case. In this way, a specific number of welded connections are produced in the portion by a first welding process, and this portion or section is passed on to a further welding process and further welded connections are generated during this second welding process. The welding process is preferably carried out twice.

With regard to the welding process, resistance welding processes are used with preference. The plurality of welding processes involved can be carried out by different welding methods, although it is preferred for two welding processes of the same welding method to be carried out, since in this way the technical expenditure with regard to the welding installations can be reduced. The carrying out of the welding processes is advantageously performed in a controlled manner, that is to say devices are provided to ensure that, specifically when resistance welding methods are used, not only a current flow in a downstream welding process flows through the welded connections already produced but also additional welded connections are produced in other partial regions of the portion. The welding processes are thereby carried out in a locally separate manner with respect to an advancing portion of the fleece or of the layer.

In accordance with another mode of the invention, it is particularly advantageous if step b) is carried out by roller seam welding. In roller seam welding, the layer or the fleece is passed through a pair of rollers or rolls, with respect to which a voltage is applied. This results in a current flow through the metallic fibers, whereupon heat is generated due to the electrical resistance in the fibers. This heat causes a melting of the fiber material in the contact regions of the metallic fibers, creating integral bonds with respect to neighboring fibers. When carrying out the roller seam welding, currents may be applied intermittently (for example with a predetermined pulse duration and a predetermined pause duration) or as a constant current. In order to ensure adequate contact of the rollers or rolls with respect to the layer or the fleece, the fleece or the layer is pressed by the rollers, in particular involving a pressing pressure in the range of from 500 to 1,500 $N/cm^2$.

Usually, however, a current flow is not produced over the entire contact region of the rollers or rolls, since it usually chooses the transition to the opposite roll with the least electrical resistance. For this reason, in such a portion of the fleece only a multiple, punctiform welding of the fibers is generated during a single welding process. In a preferred way of carrying out step b), both welding processes are performed as roller seam welding, with welded connections in the regions between the first welded connections of a portion or section being produced in the second roller seam welding.

In accordance with a further mode of the invention, during step b), a plurality of weld seams that cross one another are formed. Therefore, for example, weld seams running substantially parallel to the transporting direction can be produced during a first welding process, with the weld seams describing the zones of the fleece in which there is a concentrated accumulation of welded connections. In a subsequent welding process, weld seams running obliquely or transversely in relation to the first seams are produced. Consequently, the weld seams advantageously form a kind of pattern.

In accordance with an added mode of the invention, it is also proposed that, during step b), an inert gas be conducted to the portion or section of the fleece. Gas including argon and/or helium is to be considered, for example, as the inert gas. This makes it possible to prevent the material of the metallic fibers from oxidizing, and consequently, for example, hindering downstream resistance welding methods in the forming of integral bonds.

With the objects of the invention in view, there is also provided a device for welding metallic fibers. The device comprises a feeding unit for feeding a layer of metallic fibers. A first welding station produces connections or joints between the fibers in a portion or section of the layer, and a second welding station receives the partially-welded portion of the layer and produces further connections or joints between the fibers. This device is suitable, in particular, for carrying out the method according to the invention for producing a fleece from metallic fibers.

The feeding unit is preferably constructed in such a way that a continuous feed to the welding stations is made possible, in particular at a transporting speed in the range of from 1 m/s to 10 m/s. The feeding unit may be formed, for example, as a conveying unit. In order to fix the metallic fibers until the first and/or second welding station is reached, the feeding unit may be formed with holding devices, such as for example guides, magnets, etc. Preferably, the feeding unit can vary the transporting speed of the layer. Furthermore, it is also advantageous that devices for determining the weight of a portion of the layer are combined with the feeding unit.

The transport of the layer to the first welding station is then performed through the use of this feeding unit. The layer with the loose metallic fibers is pre-fixed through the use of the first welding station, with a specific number of welded connections being produced. This portion or section is then transported further, in particular by the feeding unit, to the second welding station, which is disposed at a distance from the first welding station in the transporting direction. In this case, further welded connections are then formed with respect to the portion or section of the layer that has already been welded once. In principle, the first welding station and the second welding station may be combined in one installation, but it is also possible for the welding stations to be formed as separate installations.

In accordance with another feature of the invention, it is particularly preferred that the first welding station and the second welding station be suitable for carrying out the roller seam welding. This means, in particular, that a device for providing a welding current with the required current intensity or for providing the current pulses with predetermined (possibly variable) frequency is provided. Furthermore, a device for providing an intermittent or constant current flow may be provided. It is also possible for a device for providing inert gas, a device for checking the welded connections and/or other properties of the fleece as well a corresponding welding controller, to be provided.

In accordance with a further feature of the invention, it is advantageous that at least one of the welding stations, either the first or the second, has at least two roller electrodes, through which the layer with fibers can be passed and which can pass a current flow through the fibers, with at least one roller electrode having a device for varying the welding position. It is preferred that both welding stations be formed with such a device for varying the welding positions with respect to the portion or section of the fleece and/or with respect to the welding position of the other welding station. The device for varying the welding position makes it possible, for example, that not the entire circumferential surface of the roller electrode is brought into contact with the fibers in the region of the portion or section but rather only individual zones are made to establish an electrically conducting contact with the layer or the fleece. With regard to the configuration of such devices, reference is made in particular to the following explanations of further advantageous configurations and to the description of the figures. It is clear from this that a person skilled in the art is familiar with further, possibly implicitly known, devices that result in a variation of the welding position with the same effect. Such customary modifications may likewise have advantages with regard to the application-specific configuration of a fleece.

In accordance with an added feature of the invention, at least one roller electrode is formed with a plurality of sections, which can produce a current flow independently of one another through the fibers contacted by them. This means, in other words, that, for example, a welding station is formed with a roller electrode over the entire width of a portion of the fleece transversely relative to the transporting direction, but has a plurality of segments that extend only over part of this width. By way of illustration, three or four roll-like roller electrodes can be disposed next to one another, for example, respectively having a separate current circuit. When the layer or the fleece passes through, weld seams running in the transporting direction or sheets with welded connections are thus produced, and it is possible for them to take different forms in each case with regard to the frequency, orientation, size etc. Consequently, a plurality of weld seams are produced independently of one another at the same time in one portion or section and at one welding station. This has the advantage, for example, that it is possible to respond to different distributions of the fibers within the layer or to reduce the technical requirements for the welding station in such a way that lower pressing pressures or lower currents have to be provided through the use of the roller electrodes or their separate zone.

In accordance with an additional feature of the invention, specifically to simplify the feeding of currents to the segments of the roller electrode, to avoid space-related problems and the like, it may also be advantageous for the plurality of sections of the at least one roller electrode to be disposed offset relative to one another in the transporting direction of the layer. Such an offset configuration of the segments is preferred, for example, whenever more than 2 segments are present, in particular more than 5.

In accordance with yet another feature of the invention, at least one roller electrode is formed with a profile. This means, in other words, that the roller electrode is not formed with a smooth, substantially cylindrical circumferential surface, but rather elevations and depressions are provided on the circumferential surface. The elevations and depressions may be formed as nubs, lines, microsurfaces and/or as complex patterns. This achieves the effect of forming the circumferential surface with different spacings from the layer or the fleece, with the projections providing better electrical contact with the metallic fibers, and consequently being regarded as a preferred region for the forming of welded connections. The profiling of the roller electrode therefore has the effect of producing, within a portion or section of the fleece, regions with a great welding probability that are smaller than the overall width of the roller electrode. When using a downstream welding process and using similarly profiled roller electrodes, this opens up the possibility, for example, of offsetting the preferred regions for welded connections in relation to one another, so that in the end a relatively uniform welding of the fibers can be accomplished over the entire portion. This counteracts the phenomenon that, in a downstream roller seam welding process, the current flow preferably flows through the regions of the fleece with respect to which welded connections have already been executed.

In accordance with yet a further feature of the invention, at least one welding station is formed with a device for changing the position of an axis of rotation of at least one roller electrode. This means, in particular, that the position of the axis of rotation can be displaced and/or inclined. Preferably, an angle of the axis of rotation is changed with respect to a surface formed by the fleece passed through. Consequently, likewise only a specific partial region of the roller electrode is brought into contact with the fiber fleece, with tumbling of the roller electrode possibly resulting, for example, in a welding process that runs back and forth in the portion or section of the fleece. In this case, too, an adaptation of the circumferential surface of the roller electrode may be necessary, in particular it may be formed in a convex manner.

In accordance with yet an added feature of the invention, a device for changing the welding stations in relation to one another is provided. In particular, the device makes it possible to change the distance between the welding stations. It is consequently possible, for example, for the roller electrodes to be formed with a specific profile and operated synchronously, but for superposing of the welded connections produced to be avoided due to adapted variation of the distance between the positions of the welding stations. The devices for changing the position of the welding stations may also include at least one sensor, drive and/or at least one adjusting unit.

In accordance with yet an additional feature of the invention, at least one welding station is formed with a device for providing an inert gas in the region of the welding position. This includes, in particular, a storage container, a supply line and an outflow unit for an inert gas including argon and/or helium.

With the objects of the invention in view, there is furthermore provided a fleece, comprising metallic fibers of a material resistant to high temperatures and corrosion. The fleece is produced by the method or the device according to the invention.

With the objects of the invention in view, there is concomitantly provided a method for using a fleece produced by the method according to the invention or with the device according to the invention, for the treatment of a stream of exhaust gas.

Other features which are considered as characteristic for the invention are set forth in the appended claims, noting that the features individually presented in the claims can be combined with one another in any desired, technologically meaningful way, so that further configurations of the invention are thereby provided.

Although the invention is illustrated and described herein as embodied in a method and a device for welding metallic fibers into a fleece by repeatedly carrying out a welding process, a fleece having welded metallic fibers and a method of filtering exhaust gas with a fleece, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
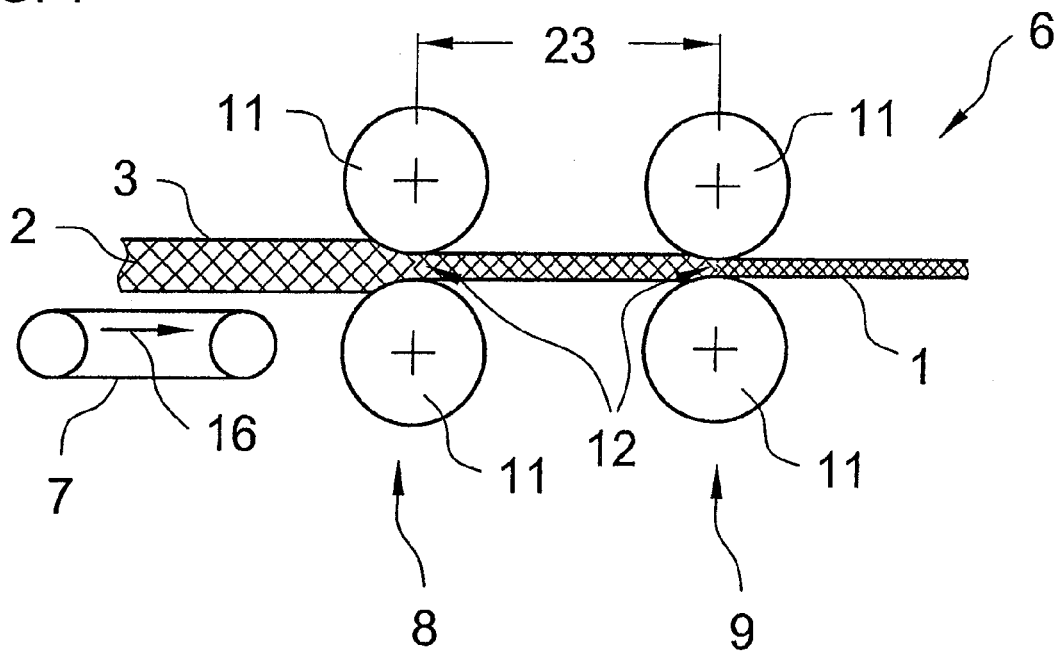
FIG. 1 is a fragmentary, diagrammatic, longitudinal-sectional view of an exemplary embodiment of a device for welding metallic fibers.

Referring now in detail to the figures of the drawings, which show particularly preferred exemplary embodiments to which the invention is not restricted and which are diagrammatic representations and therefore not intended to be used, in particular, for illustrating relative sizes, and first, particularly, to FIG. 1 thereof, there is seen a device 6 for welding metallic fibers 2 to produce a fleece 1. In this case, the fibers 2 are initially disposed in a loose interconnected structure to form a layer 3, which is fed toward first and second welding stations 8 and 9 by a feeding unit 7 in a transporting direction 16. The feeding unit 7 is diagrammatically represented herein as a conveyor belt.

The layer 3 is then initially passed through two roller electrodes 11 of the first welding station 8, in which a plurality of welded connections or joints is produced with respect to a first welding position 12. When the layer 3 is passed through the roller electrodes 11, the layer 3 is compressed and a current flow through the layer 3 is generated in certain regions at the same time. This partially bonded and partially welded fleece 1 is then fed to the second welding station 9, which is positioned at a predetermined distance 23 from the first welding station 8. In the case of the roller seam welding in the region of the second welding station 9, a further compression of the fleece 1 and an additional formation of welded connections or joints also take place. The fleece 1 leaving the second welding station 9 then has a stability, with regard to its structure, that ensures sustained use for exhaust treatment units of mobile internal combustion engines. In particular, with the variant of the device 6 represented herein, welding of the fibers 2 to one another to form a fleece 1 is accomplished while repeatedly carrying out a welding process with respect to a portion or section 4 (seen in FIG. 5) of the fleece 1.

Figure 2:
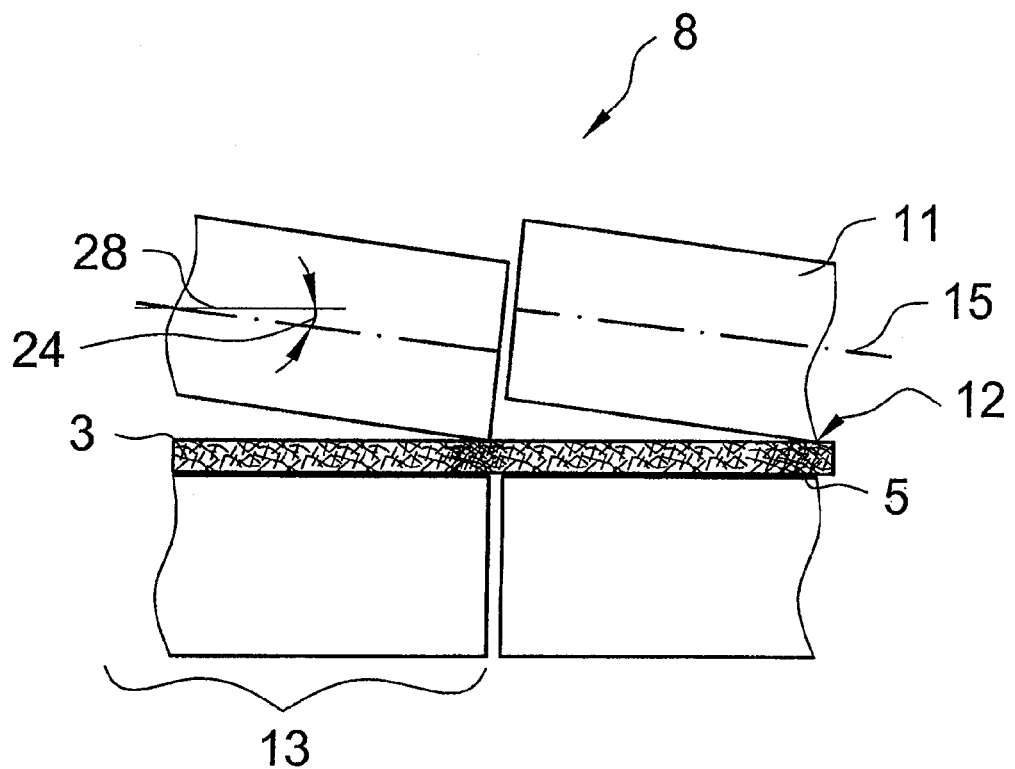
FIG. 2 is a fragmentary, longitudinal-sectional view of a variant of the embodiment of a welding station with a device for changing a position of an axis of rotation of a roller electrode.

FIG. 2 illustrates a variant of the embodiment of the first welding station 8 with tumbling roller electrodes 11. In principle, the second welding station 9 may also be formed in a similar way. In the case of the variant of the embodiment represented, only the roller electrodes 11 disposed as upper electrodes with respect to the layer 3 are formed in a tumbling manner. Nevertheless, however, the lower roller electrodes 11 may also be formed in a tumbling manner. The tumbling, which may take place continuously or intermittently, includes in particular a deviation of an axes of rotation 15 by a specific angle 24 with respect to the horizontal 28. In this way, the welding position 12 for the formation of a weld seam 5 or connections or joints 10 (seen in FIG. 6) is made possible and varies, for example, over a section 13 and/or transversely in relation to the transporting direction 16 (seen in FIG. 1). In the illustrated exemplary embodiment, the two represented sections 13 of the roller electrode 11 tumble synchronously, but this is not absolutely necessary.

Figure 3:
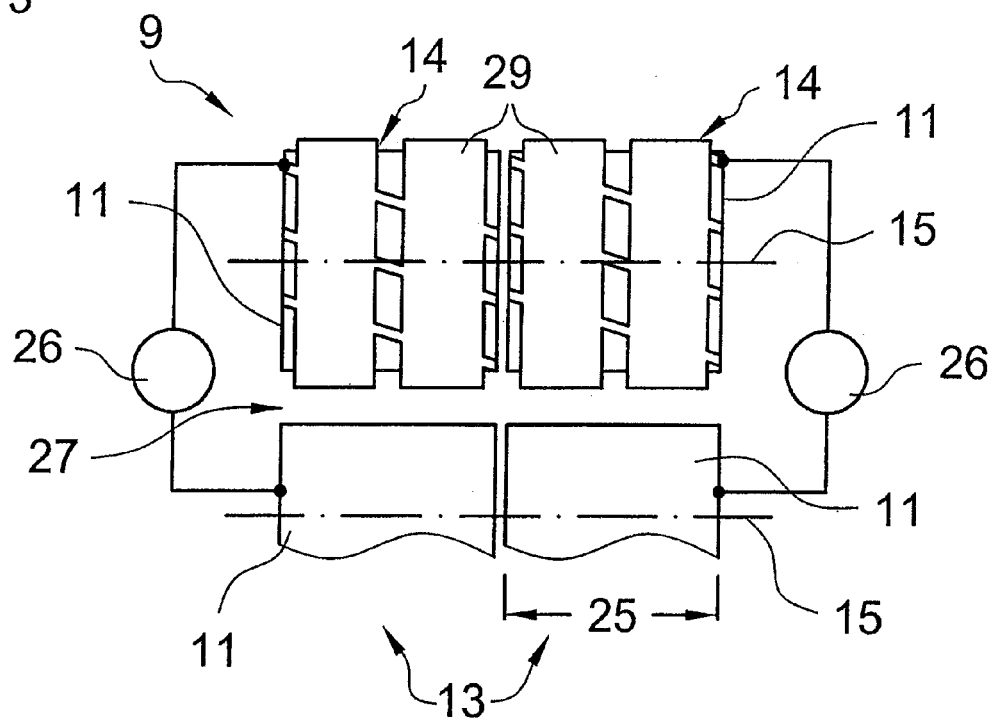
FIG. 3 is a fragmentary, side-elevational view of a further variant of an embodiment of a welding station with a roller electrode which is profiled and subdivided into sections.

FIG. 3 shows a further exemplary embodiment of a (segmented) roller electrode 11 of a second welding station 9. The sections 13 of the roller electrode 11 are formed with respective circumferential surfaces 29, which have a profile 14 (to differing degrees in this case). The sections 13 have the same axis of rotation 15. Each of the sections 13 of the roller electrodes 11 is formed in such a way that they can produce a current flow through the non-illustrated fibers 2 contacted by them, independently of one another. For this purpose, they have separate respective power supplies 26, which are respectively made to establish a contact with the opposite pair of sections 13 of the roller electrode 11. In order to form welded connections, the non-illustrated layer 3 or the fleece 1 is passed through a gap 27 between the roller electrodes 11. The roller electrodes 11 or the sections 13 are preferably formed with a width 25 that is at most 100 mm.

Figure 4:
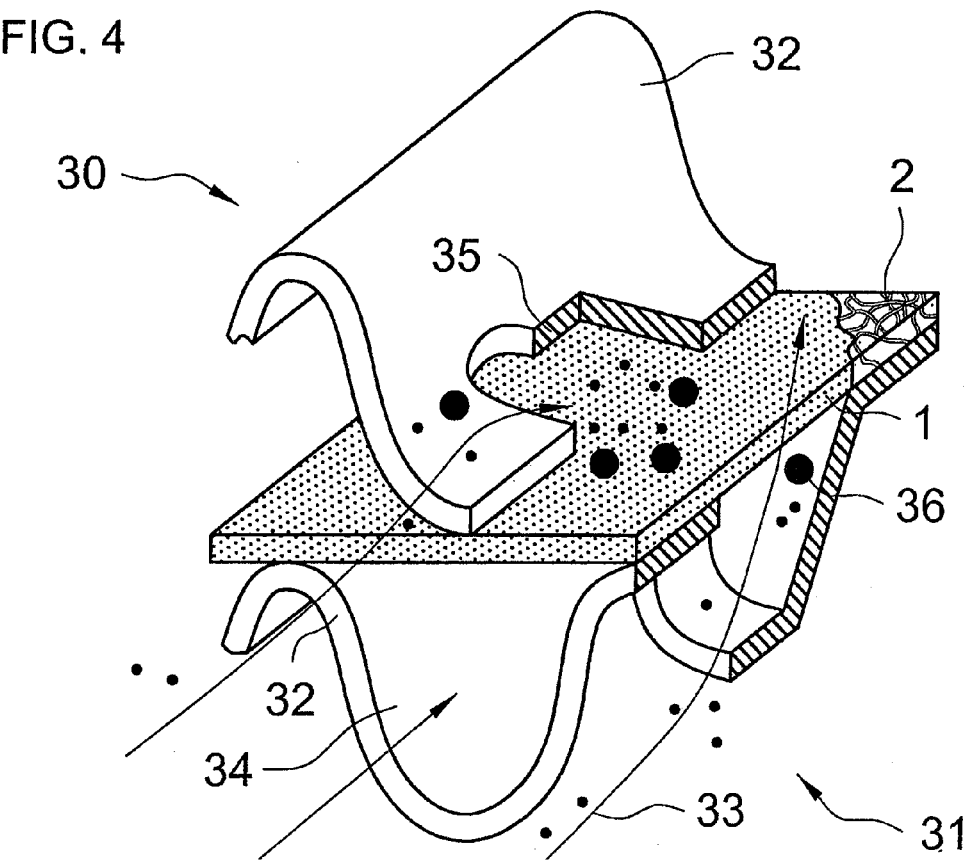
FIG. 4 is an enlarged, fragmentary, perspective view of an exhaust treatment unit with a fleece of metallic fibers.

FIG. 4 shows a portion of an exhaust treatment unit 30 including a honeycomb body 31, which is constructed with a plurality of structured metal foils 32 and a plurality of fleeces 1, in such a way as to form passages 34 through which an exhaust gas can flow in a flow direction 33. Flow influencing elements 35 have the effect of deflecting the stream of exhaust gas toward the fleece 1, so that entrained particles 36 are adsorbed there. The illustrated portion of the exhaust treatment unit 30 represents, in particular, a portion of a particle trap or a filter. The exhaust treatment unit 30 is preferably integrated in an exhaust system of a vehicle (having a gasoline or diesel engine).

Figure 5:
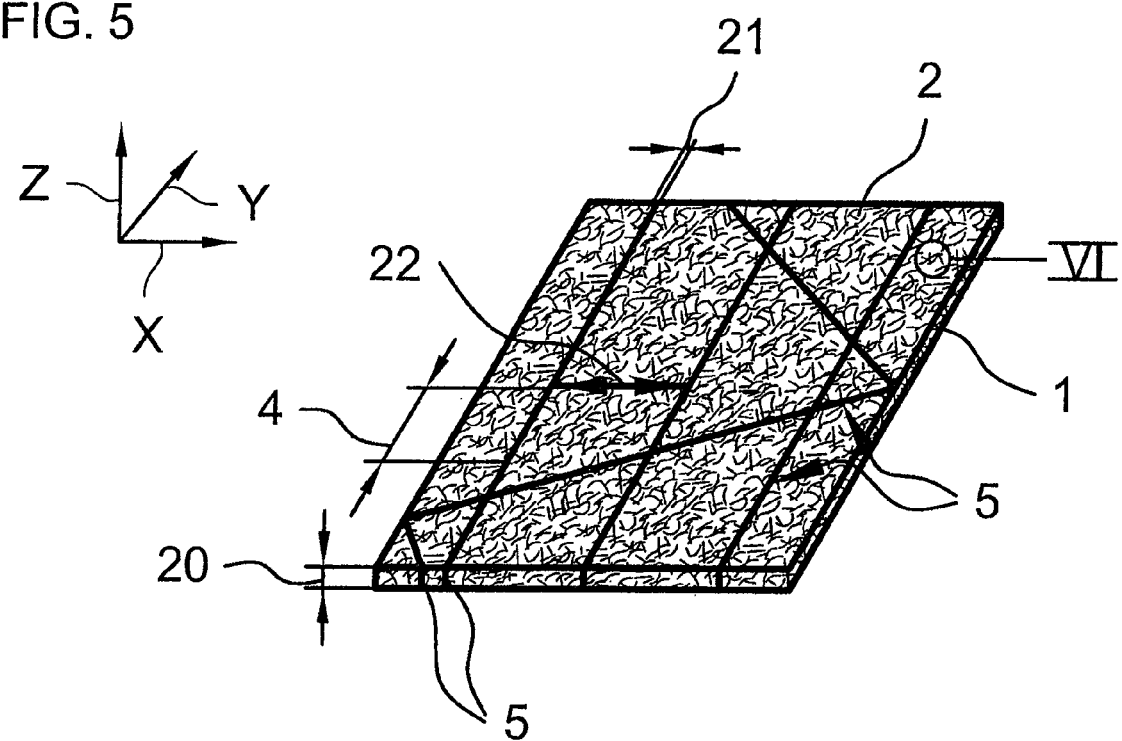
FIG. 5 is a perspective view of an exemplary embodiment of a fleece of metallic fibers.

FIG. 5 illustrates a fleece 1 according to the invention, which has been subjected to a number of welding processes with respect to a portion 4. The portion 4 extends in this case in a direction Y, which preferably corresponds to the transporting direction 16. The fleece width is preferably determined in a direction X and the fleece thickness 20 in a direction Z. As a result of the repeated carrying out of a roller seam welding method, a number of weld seams 5 are formed, at least partially crossing one another. The weld seams 5 may be disposed with a desired extent 21 and with a desired spacing 22 relative to one another. At this point, it should explicitly be pointed out that the extent 21 and the spacing 22 are merely diagrammatically represented and it is preferably also possible for the extent 21 to be greater than the spacing 22. One of the weld seams 5 has a zigzag shape which can be achieved, for example, by tumbling roller electrodes. The weld seams 5, running parallel or perpendicular to one another, may be generated, for example, with a profiled roller electrode 11.

Figure 6:
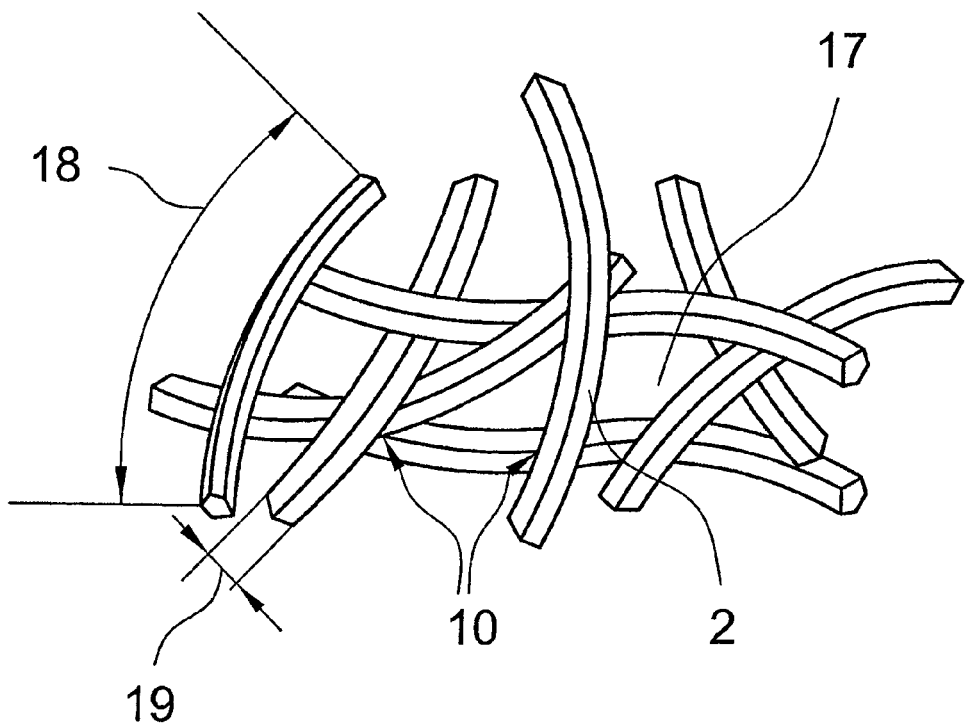
FIG. 6 is an enlarged, perspective view of a portion VI of the fleece of FIG. 5.

FIG. 6 illustrates a portion of the fleece 1 of FIG. 5, in which the fibers 2 have been enlarged. As a result of the repeated carrying out of the welding process, the metallic fibers 2, disposed randomly relative to one another, form connections 10 with one another in the vicinity of contact with one another. The fibers 2 are formed in this case with a polygonal cross section, and it is possible for the fibers 2 to be described by a fiber length 18 and a fiber diameter 19. Pores 17 of differing number and differing size can be formed with the fibers 2 by varying the formation of the layer with metallic fibers as a loose interconnected structure and the forces acting on the fleece 1 or the layer 3 during the welding processes. It thus is possible to set a desired porosity (for example in the range of from 45 to 70%) of the fleece 1.

Figure 7:
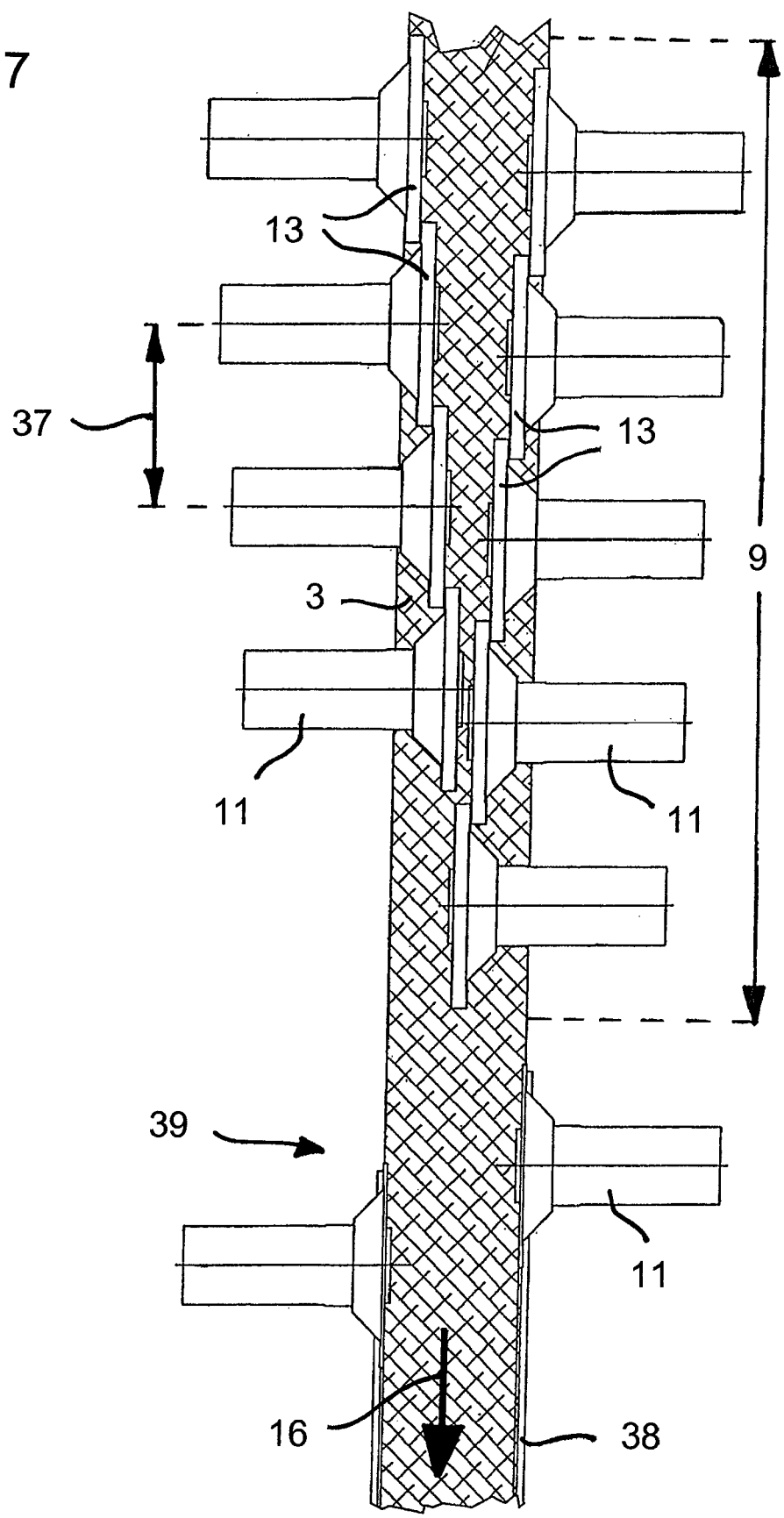
FIG. 7 is a fragmentary, plan view of a further exemplary embodiment of a device for welding with offset roller electrodes.

FIG. 7 illustrates part of a further exemplary embodiment of a three-stage welding device. The second welding station 9, which is represented in this case, is formed with a plurality of roller electrodes 11, that form a plurality of sections 13, which are disposed with an offset 37 relative to one another in the transporting direction 16 of the layer 3. This variant allows uniform introduction of the welding current into the layer 3, with the sections 13 together again covering the entire width of the layer 3. Independently thereof, the non-illustrated first welding station may be formed according to one of the described variants of the embodiment. The second welding station 9 is also followed by an apparatus 39 for treating an edge 38 of the layer 3, which, for example, is a metal foil being fastened in the manner of a seam in order to form a gas-impermeable edge 38, which may possibly serve as a fastening region for joining a number of fleeces to one another. For this reason, the apparatus 39 may likewise be formed with a number of roller electrodes 11.

The invention claimed is:

1. A method for producing a fleece from metallic fibers, the method comprising the following steps:
    a) forming a layer with metallic fibers; and
    b) welding the fibers to one another to form a fleece by repeatedly carrying out a welding process relative to a portion of the fleece to further compress the portion of the fleece and additionally form welded connections or joints due to the repeated welding.

2. The method according to claim 1, which further comprises carrying out step b) by roller seam welding.

3. The method according to claim 1, which further comprises forming a plurality of weld seams crossing one another, during step b).

4. The method according to claim 1, which further comprises conducting an inert gas to the portion of the fleece, during step b).

5. A device for welding metallic fibers, the device comprising:
    a feeding unit for feeding a layer of metallic fibers;
    a first welding station for producing connections between the fibers in a partially-welded portion of the layer and for compressing the portion; and
    a second welding station for receiving the partially-welded and partially-bonded portion of the layer, for further compressing the portion and for producing further connections between the fibers.

6. The device according to claim 5, wherein said first welding station and said second welding station are roller seam welding stations.

7. The device according to claim 6, wherein at least one of said first or second welding stations has at least two roller electrodes for guiding the layer of fibers therethrough and for passing a current flow through the fibers, at least one of said roller electrodes having a varying welding position.

8. The device according to claim 7, wherein at least one of said roller electrodes has a plurality of sections for producing a current flow independently of one another through the fibers contacted by said sections.

9. The device according to claim 8, wherein said plurality of sections of said at least one roller electrode are offset relative to one another in a transporting direction of the layer.

10. The device according to claim 7, wherein at least one of said roller electrodes has a profile.

11. The device according to claim 7, wherein at least one of said roller electrodes of at least one of said welding stations has an axis of rotation with a variable position.

12. The device according to claim 5, wherein said welding stations have mutually varying positions.

13. The device according to claim 5, wherein at least one of said welding stations has a welding position in the vicinity of which an inert gas is available.

14. A fleece, comprising:
    metallic fibers of a material resistant to high temperatures and corrosion, the fleece being produced by the method according to claim 1.

15. A fleece, comprising:
    metallic fibers of a material resistant to high temperatures and corrosion, the fleece being produced by the device according to claim 5.

16. A method for filtering a stream of exhaust gas, the method comprising the following step:
    filtering the stream of exhaust gas with the fleece produced by the method according to claim 1.

17. A method for filtering a stream of exhaust gas, the method comprising the following step:
    filtering the stream of exhaust gas with the fleece produced by the device according to claim 5.

18. The device according to claim 5, wherein said first welding station and said second welding station produce a plurality of weld seams crossing one another.

19. The method according to claim 1, which further comprises carrying out step b) by passing a current through the metallic fibers to generate heat due to electrical resistance in the fibers and melt the fibers in contact regions of the metallic fibers, creating integral bonds.

20. The device according to claim 5, wherein said welding stations pass a current through the metallic fibers to generate heat due to electrical resistance in the fibers and melt the fibers in contact regions of the metallic fibers, creating integral bonds.

* * * * *